Dec. 31, 1935.  R. S. TROTT  2,026,445
GEAR SHIFT MECHANISM AND ENGINE MOUNTING
Filed Nov. 30, 1931
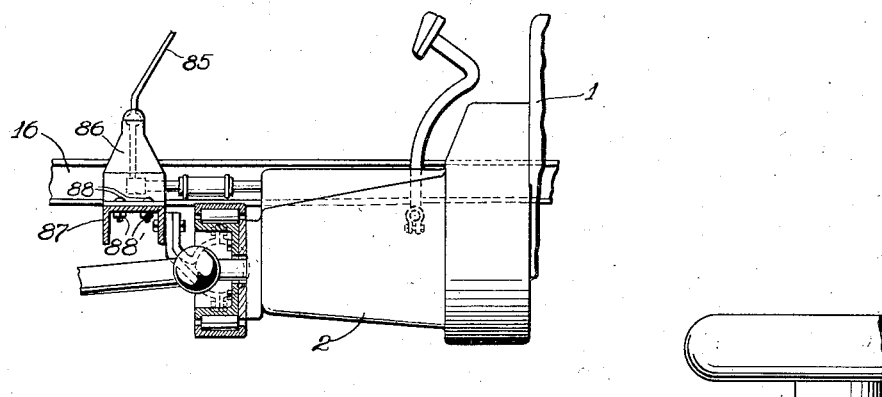
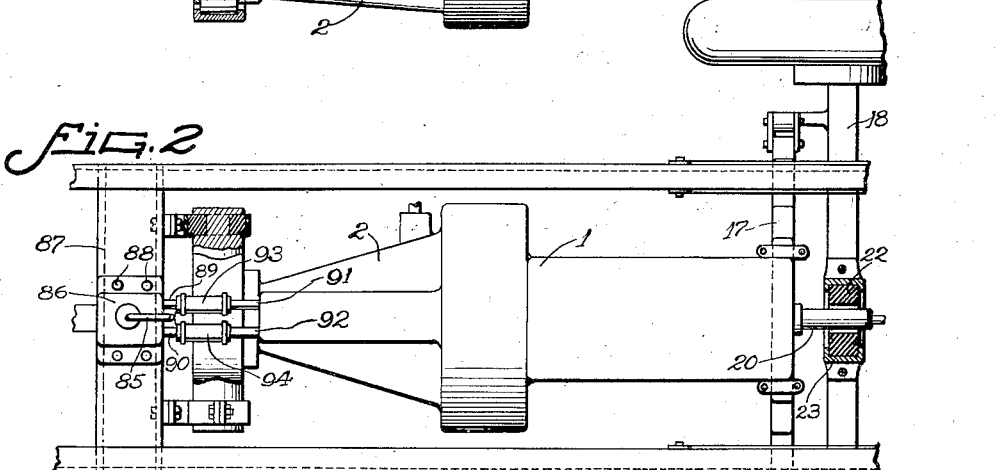
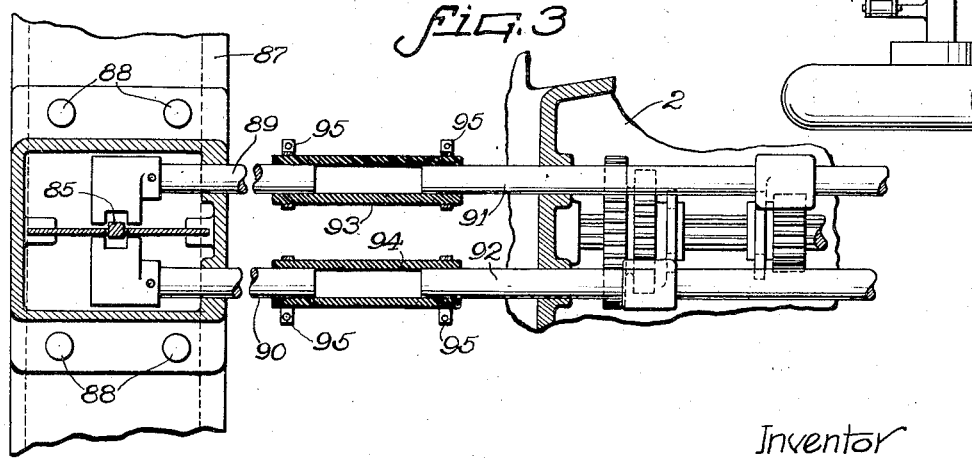
Inventor
Rolland S. Trott Patented Dec. 31, 1935

2,026,445

UNITED STATES PATENT OFFICE 2,026,445

GEAR SHIFT MECHANISM AND ENGINE MOUNTING

Rolland S. Trott, Denver, Colo.

Application November 30, 1931, Serial No. 578,109

5 Claims. (Cl. 180—64)

This invention relates to engine mountings for engines having force and torque cushioning movements with respect to the support or frame upon which they are mounted and is a continuation in part of my application for patent on Engine mountings, filed on November 24, 1928, Serial No. 321,634, now Patent No. 1,890,871, dated December 13, 1932.

The object of this invention is to provide transmission gear control mechanism for the control of the transmission gears of a power plant mounted at the rear to have orbital and substantially pivotal movements with regard to the frame, and at the front mounted movably with respect to the frame.

I accomplish this object by providing a gear-shift lever and mounting, mounted upon the cross member of the frame to the rear of the transmission of the power plant, and upon which the rear of the power plant is movably mounted and by providing means operated by the gear-shift lever for shifting the gears, which means are substantially unaffected by the movements of the power plant with respect to the frame. This construction is fully explained below and is illustrated in the drawing in which:

Figure 1 is a fragmentary side view and partial section of a motor vehicle showing the gear-shift tower and the rear of the power plant mounted upon the frame cross member to the rear of the power plant.

Figure 2 is a plan view of Figure 1, but with the clutch pedal removed, and also showing a movable mounting for the front end of the power plant.

Figure 3 is a fragmentary section showing the shift rails, the two parts of each rail being joined by a flexible connection.

In Figure 1, the engine 1 has the transmission 2 attached so that it is integral therewith, forming a unit power plant. The rear end of the power plant is mounted upon the frame cross member 87, the mounting being so arranged as to have cushioned pivotal movement with respect to the frame, whereby the rear of the power plant may not only pivot about a longitudinal axis but may, under the action of engine forces, move in an orbit due to its rubber mounting. The front end of the power plant is movably mounted and includes a cross spring 17, on the front axle 18, of the vehicle and the brackets 20 and 23, and the rubber 22, as shown in Figure 2, such mounting permitting and resiliently limiting the transverse pivotal and orbital movement, of the front end of the engine, and thereby controlling the movements of the engine as a whole with respect to the frame.

The gear-shift lever 85 is universally mounted and held in the tower 86 by any of the usual constructions. The tower 86 is mounted upon the frame member 87, and secured thereto by the cap screws 88, and nuts 88'. The shift rails 89 and 90 are arranged to be engaged selectively by the gear-shift lever 85, in the usual manner.

The front ends 91 and 92 of the shift rails 89 and 90 respectively are connected with the rear ends 89 and 90 by the flexible couplings 93 and 94 respectively, which couplings are secured in place by the clamps 95. The couplings 93 and 94 may be made of rubber, fabric, rubberized fabric, or any other proper material which will act to cause both ends of the shift rails to move longitudinally together as a unit while permitting pivotal and orbital movement of the power plant on its mountings on the chassis without materially affecting the longitudinal position of the transmission gears.

The tower 86 is mounted close to the rear mounting of the power plant and the flexible connections 93 and 94 are in the vertical plane of the rear mounting, thereby allowing freedom of relative movement of the front end of the power plant with respect to the frame 16, about the rear mounting as a center. The connection between the gear shift lever 85, and the gears of the transmission is such as to move the gears selectively, longitudinally, in shifting, while permitting all relative movement between the power plant and the frame 16, without materially changing the position of said gears.

Having now described my invention, what I claim as new, and desire to protect by Letters Patent is as follows:

1. In a motor vehicle having a frame, the combination of an engine unit including an engine and a shift gear transmission supported by the vehicle for transverse movement relative thereto, gear shift means carried by the frame independently of the engine unit, and means mounted for movement longitudinally of the vehicle and connecting said gear shift means with the shift gear of the transmission and having a flexible portion intermediate the ends thereof, yieldable to permit transverse movement of the engine unit relative to the frame.

2. In a vehicle having a frame, the combination of an engine unit including a transmission mounted on the vehicle and capable of lateral angular movement relative to the frame about an axis extending longitudinally of the engine unit approximately coincident with the crankshaft of the engine unit adjacent the rear portion of the engine unit, said transmission having longitudinal shift-rods centrally located above the axis of oscillation, and a gear-shift lever mounted on the frame in position for selective engagement with the shift-rods, each of said shift-rods having flexible means intermediate the ends thereof permitting lateral angular movement of the transmission relative to the shift-lever.

3. In a vehicle having a frame, the combination of an engine unit including a shift-gear transmission, means mounting said engine unit in the vehicle for lateral angular movement relative to the frame about an axis extending longitudinally of the engine unit approximately coincident with the crankshaft of the engine unit adjacent the rear portion of the engine unit, said mounting means including a rear mounting mounting the rear portion of the engine unit on the frame, said transmission having longitudinal shift-rods centrally located above the axis of oscillation, and a gear-shift lever mounted on the frame in position for selective engagement with the shift-rods, each of said shift-rods having a non-metallic resilient portion intermediate the ends thereof permitting lateral angular movement of the transmission relative to the shift-lever.

4. In a vehicle, the combination of an engine unit including a transmission mounted on the vehicle capable of lateral angular movement relative thereto, longitudinally movable shift-rods operatively connected with the transmission, a gear-shift lever mounted on the vehicle independently of the engine unit for selective operation of the shift-rods, each of said shift-rods having non-metallic flexible means intermediate the ends thereof permitting lateral angular movement of the transmission relative to the shift-lever.

5. In a vehicle having a chassis frame, the combination of an engine unit including a transmission mounted on the vehicle capable of lateral angular movement relative thereto, longitudinally movable shift-rods operatively connected with the transmission at one end, a mounting on the chassis frame receiving and mounting the other ends of the shift-rods, a gear-shift lever carried by said mounting for selective engagement with the adjacent ends of the shift-rods, each of said shift-rods having flexible means intermediate the ends thereof permitting lateral angular movement of the transmission relative to the shift-lever.

ROLLAND S. TROTT.